June 22, 1926.　　　　　　　J. WALDHEIM　　　　　　　1,589,774

TYPEWRITING MACHINE

Filed Feb. 9, 1923　　　　2 Sheets-Sheet 1

Inventor:
John Waldheim
by D.C. Stickney
Attorney

June 22, 1926.
J. WALDHEIM
1,589,774
TYPEWRITING MACHINE
Filed Feb. 9, 1923
2 Sheets-Sheet 2
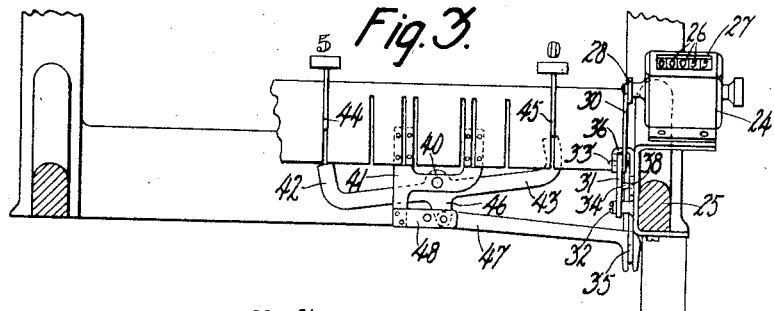
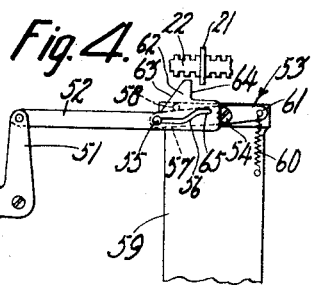
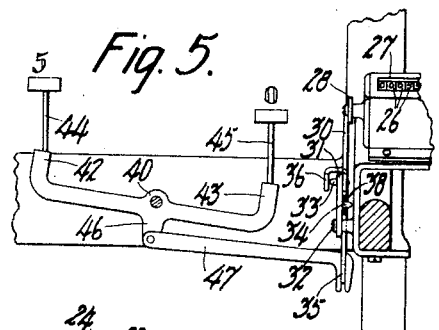
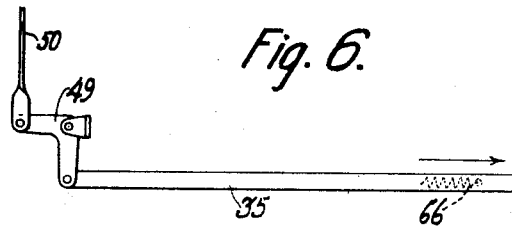
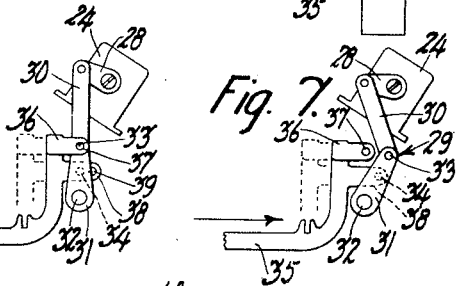
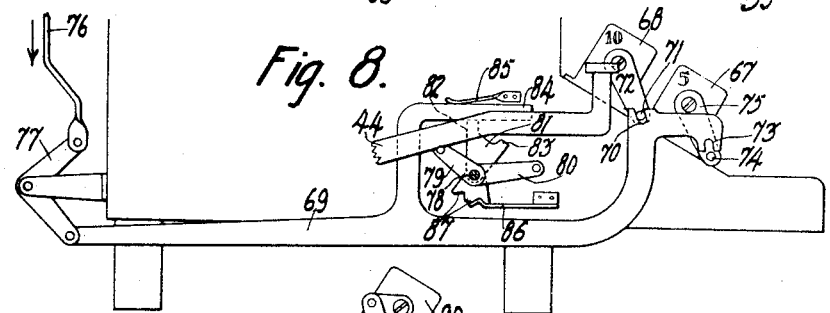
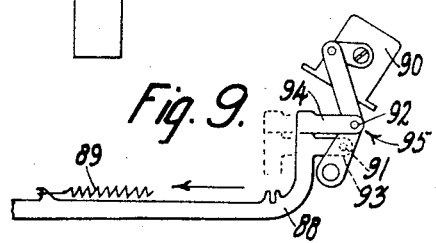
Inventor:
John Waldheim
by B. L. Stickney
Attorney Patented June 22, 1926.

1,589,774

UNITED STATES PATENT OFFICE.

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed February 9, 1923. Serial No. 617,909.

This invention relates to typewriting machines, for writing bills for telephone service, in which operation it is required to type separately the amounts of United States taxes.

It is desired not only to type the tax items separately, but also to indicate the total amount of the tax items for a day or other long period. The present invention relates to securing such totals. In carrying out the invention, register mechanism is provided for adding 5 after the writing of each 5-cent tax item, and for adding 10 after each 10-cent tax item (these amounts being the only amounts ever written in the tax column). The regular keys are used for writing the tax items, the "5" and "0" keys being arranged to set register-controlling mechanism as an incident of their writing operations. These keys do not directly operate the register mechanism, the actual addition being effected by a register-operating member which is engaged and moved by a tabulator-stop on the carriage as the carriage passes out of the tax column in the course of the carriage-return movement. The tax column is the last column on the page, and the carriage is never moved into this column except when a tax item is to be written. It will be evident, therefore, that addition is effected only when tax items are written, and not when the "5" and "0" keys are used for other purposes. Should an incorrect item be written in the tax column, the operator may correct the error by writing the proper amount in its place before returning the carriage, whereupon the connections will be established for adding the proper amount, the first setting being nullified by the second. Should a key be struck too lightly in writing a tax item, it may be struck a second time, prior to the return of the carriage, without affecting the correctness of the total exhibited. The touch of the "5" and "0" keys will not be substantially heavier than the touch of the other keys, since very little force is required to set the register connections.

In the preferred form of the invention, a single register is provided which is arranged to count by 5, and which is connected to a toggle arranged to operate it once or twice at each full operation of a toggle-operating member, according to the connections established between the toggle and its operating member. Such connections are controlled by the "5" and "0" keys through a lever beneath them, arranged to be engaged and moved in opposite directions by them. This lever is connected to the toggle-operating bar through a link to move the toggle-operating bar laterally in opposite directions. Movement of the lever by the "5" key causes the operating bar to be moved in one direction and to be connected to the toggle at the joint, and movement of the lever by the "0" key causes the operating bar to moved in the opposite direction and to be connected to the toggle at the middle of one of its links. The next ensuing stroke of the operating bar causes a single oscillation of the register-operating arm in the former case, adding 5, but causes two oscillations of the register-operating arm in the latter case, adding 10.

A tabulator-stop on the carriage, for controlling the movement of the carriage to the tax column, extends farther to the rear than the other tabulator-stops. This long stop engages a link as the carriage leaves the tax column in the carriage-return movement, and moves the link bodily until a cam-surface on the link is engaged by a member on the machine-frame, to cause the link to be lowered beyond the path of the tabulator-stop. The link is connected through suitable mechanism to actuate the toggle-operating bar.

In a modified form of the invention, a pair of registers is provided for separately adding the 5 and 10 cent items. The register-operating bar is raised by operation of the "0" key, and thereby connected with the operating arm of the "10" register, and is lowered by operation of the "5" key, and thereby connected with the operating arm of the "5" register. In this form, as in the preferred form of the invention, the operating bar is actuated by the carriage in the return movement thereof.

Other features and advantages will hereinafter appear.

In the accompanying drawings,

Figure 3 is a fragmentary, sectional, front elevation, showing the arrangement of the "5" and "0" keys with reference to the register-controlling mechanism.

Figure 4 is a fragmentary, rear elevation, showing a portion of the register-operating mechanism.

Figure 5 is a fragmentary, sectional, front elevation, similar to Figure 3, but showing the "0" key depressed and the parts in their corresponding positions.

Figure 6 is a side elevation, showing the register-operating bar fully advanced when connected to the toggle at the joint, the toggle being straightened accordingly.

Figure 7 is a fragmentary view, similar to Figure 6, showing the register-operating bar in fully advanced position when connected to the lower toggle-link at its middle.

Figure 8 is a fragmentary, diagrammatic, side elevation of a modified form of the invention, wherein two registers are employed.

Figure 9 is a fragmentary view, in side elevation, of a further modification of the invention shown in Figures 1 to 7.

Figure 1:
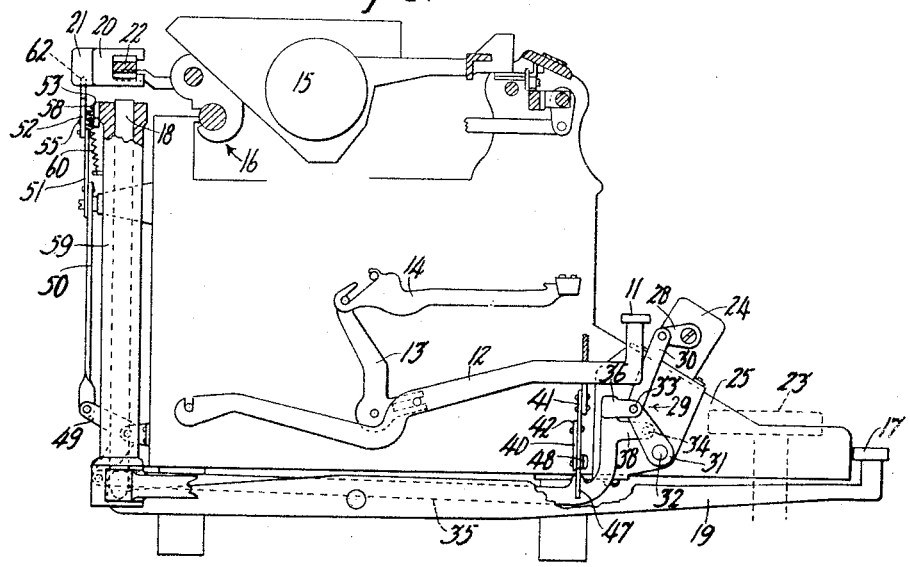
Figure 1 is a sectional, side elevation of an Underwood typewriter having the present invention applied thereto.
Figure 2:
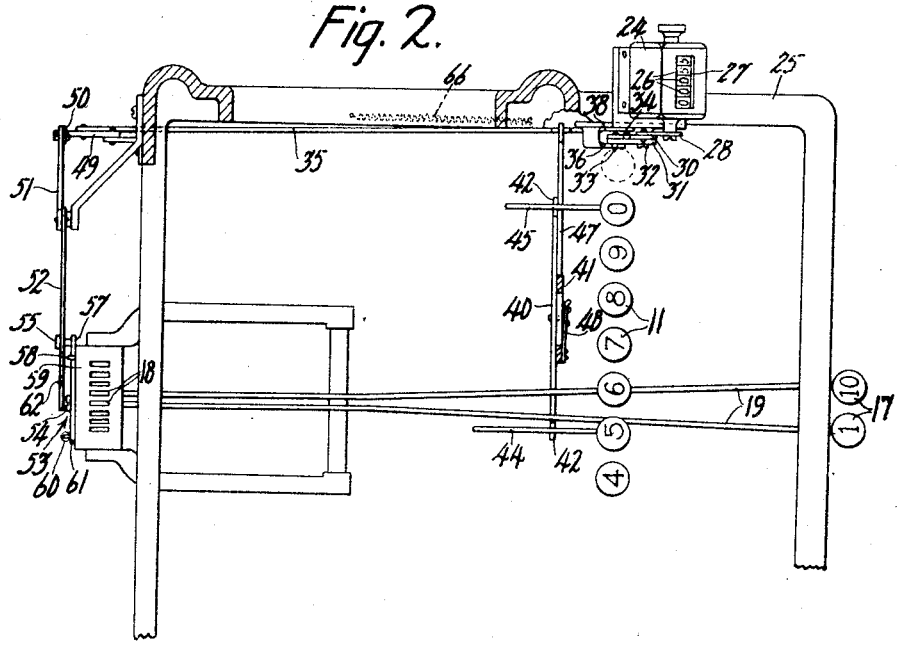
Figure 2 is a fragmentary, horizontal section, showing the register-controlling and operating mechanism.

The machine comprises the usual keys 11, including numeral-keys from "0" to "9", inclusive, which operate key-levers 12 to cause bell-cranks 13 to throw type-bars 14 up to strike rearwardly against a platen 15, mounted in a traveling carriage 16. The carriage 16 is movable in letter-feed direction by a carriage-propelling spring (not shown), under the control of escapement mechanism (not shown). Decimal-tabulating keys 17 are effective when operated to release the carriage 16 from the influence of the escapement mechanism and cause it to be drawn toward the left by the carriage-propelling spring. Decimal-tabulating stops 18 are moved by these keys through levers 19 into positions to co-operate with stops 20 and 21, adjustably mounted upon a rack 22 on the rear of the carriage 16, to arrest the carriage in positions to cause writing to be effected in the desired columns. The carriage may be returned manually when a line has been completed, or a carriage-return key 23 may be provided for operating a carriage-return motor (not shown), of the kind disclosed in the patent to F. A. Hart, No. 1,281,362, dated October 15, 1918. In the former case, the automatic carriage-return mechanism may be omitted.

A register 24 for adding the tax items is mounted on the machine-frame 25 at the right end of the keyboard. This register is of the same general type as the Veeder cyclometer, being like the "5" key register disclosed in the application of A. G. Kupetz, Serial No. 593,218, filed October 9, 1922, and comprising a series of number-wheels 26. Inasmuch as the register 24 is to add items of 5 and 10 cents only, the wheel 26 of lowest denomination bears the numerals "0" and "5", arranged alternately, and the carry-over mechanism is arranged to actuate the wheel 26 of next higher denomination, each time that a "5" on the wheel of lowest denomination is shifted from the sight-opening 27 and replaced by a "0". The carry-over from the second wheel to the third is effected in the usual way, that is, only upon the completion of a revolution of the second wheel, and the same is true of other wheels of higher denominations.

A register-operating arm 28 is pivotally connected to one end of a toggle 29, comprising links 30 and 31, the latter of which is pivoted on a fixed stud 32. The link 31 has a bevel-ended pin 33 extending laterally from it in one direction at the toggle-joint, and a similar pin 34 extending from it in the opposite direction at its middle. A register-operating bar 35 is bifurcated at its forward end, the fork 36 being located at one side of the toggle and having a hole 37 for receiving the pin 33, and the fork 38 being located at the opposite side of the toggle and below the fork 36, and having a hole 39 for receiving the pin 34. In the normal position of the toggle 29 and operating bar 35 (see Figure 1), one of the pins on the toggle-link 31 will always be engaged in the corresponding hole on the operating bar, and the other will be in alignment with its hole on the operating bar, so that, by simply thrusting the operating bar sidewise when in this position, the connection between the bar and the toggle may be changed. The combined length of the pins 33 and 34 is so related to the space between the forks 36 and 38 that both pins can never be disengaged simultaneously (see Figures 3 and 5).

The connections between the operating bar 35 and the toggle 29 are controlled by the "5" and "0" keys, as follows: A three-armed lever 40 is pivoted upon a bracket 41, the arms 42 and 43 being upturned at their ends and lying in the paths of the key-levers 44 and 45 of the "5" and "0" keys, respectively. A third arm 46 of the lever 40 carries a pivoted link 47, which is interyoked with the toggle-operating bar 35 (see Figures 3, 5 and 6). It will be seen that depressions of the "5" and "0" keys will rock the arm 46 in opposite directions, moving the link 47 in opposite directions, and so moving the toggle-operating bar 35 sidewise to change the connections between itself and the toggle 29. The arrangement is such that the connection through the pin 34 is established by depression of the "0" key, and the connection through the pin 33 is established by the depression of the "5" key. A spring-detent 48 on the bracket 41 engages the lever 40 and retains it at either limit of its movement.

The operating bar 35 is advanced a uniform distance at each operation by mechanism presently to be described, the length of its stroke being sufficient to straighten the toggle 29, as seen in Figure 6, when the pin 33 is effective, and to move the toggle beyond the straightened position to the position of Figure 7 when the pin 34 is effective. The advance and return of the operating bar 35 will, therefore, oscillate the operating arm 28 of the register 24 once, adding 5, when the pin 33 is effective, and will oscillate it twice, adding 10, when the pin 34 is effective.

The toggle-operating bar 35 is connected through a bell-crank 49, a vertical rod 50 and a second bell-crank 51 to a horizontally-movable link 52. The link 52 is pivotally connected at one end to the bell-crank 51, and at its other end is yieldingly supported by a lever 53, pivoted at its middle on stud 54 and having a pin 55 which is received in a slot 56 in the link 52. The normal position of the lever 53 and link 52 is determined by engagement of the arm 57 of the lever with a stop 58 on housing 59 of the decimal-tabulator-stops 18. A spring 60 pulls the arm 61 of the lever 53 downward, and so holds the arm 57 of the lever yieldingly in engagement with the stop 58. A cam 62 on the link 52 has an inclined face 63 and a vertical face 64. The tabulator-stop 21 for controlling the movement of the carriage 16 to the tax column extends farther to the rear than the other tabulator-stops 20 on the rack 22. As the carriage moves forward in the tabulating operation, this stop 21 engages the inclined face 63 of the cam 62 and depresses it idly. As the carriage is returned, however, the tabulator-stop 21 engages the vertical face 64 of the cam 62, and moves the link 52 endwise until an inclined portion 65 of the slot 56 in the link 52 comes into engagement with the pin 55 on the lever 53, whereupon the link 52 is depressed to withdraw the cam 62 from engagement with the tabulator-stop 21. It will be seen that, so long as the link 52 is moved with the carriage by the tabulator-stop 21, the described connections will be effective to thrust the toggle-operating bar 35 forward, and that, as soon as the cam 62 is disengaged from the tabulator-stop 21, the toggle-operating bar 35 will be at liberty to return to normal position. A spring 66, connected to the toggle-operating bar 35 and to the machine-frame 25, effects this return movement.

In Figure 8 is shown a modified form of the invention. Two registers 67 and 68 are used which are arranged to add 5 and 10, respectively, at each operation. The register 67 may be like the "5" key register of the application of A. G. Kupetz, above referred to, and the register 68 may be like the "10" key register of that application. A register-operating bar 69 has an opening 70 in its upper face arranged to receive a pin 71 on the operating arm 72 of the register 68 when the bar 69 is raised, and an opening 73 in its lower face arranged to receive a pin 74 on the operating arm 75 of the register 67 when the bar 69 is lowered. The operating bar 69 is normally at the forward limit of its movement, and so are the register-operating arms 72 and 75. The bar 69 is drawn rearward upon the return of the carriage 16, through connections comprising rod 76 and bell-crank 77. The connection of the operating bar 69 to the registers 67 and 68 is controlled as follows: A rock-shaft 78 has crank-arms 79 and 80 extending in opposite directions from it in positions to be engaged and depressed by the key-levers 44 and 45 of the "5" and "0" keys, respectively. A cam-plate 81, having a high abutment 82 and a low abutment 83, is fixed on the rock-shaft 78 in position to have these abutments engage a fork 84 of the operating bar 69 to control the vertical position thereof. Depression of the "5" key rocks the shaft 78 counterclockwise, as seen in Figure 8, and permits the bar 69 to fall under the influence of gravity, assisted by a spring 85, to connect the bar with the register 67, and depression of the "0" key rocks the shaft 78 clockwise to raise the bar 69 and connect it with the register 68. A spring-detent 86 engages notches 87 in the cam-plate to retain it in either position to which it is moved.

In Figure 9 is shown a slight modification of the invention disclosed in Figures 1 to 7. The toggle-operating bar 88 is normally maintained at the advance limit of its stroke by a spring 89, and is drawn rearward by the movement of the carriage 16 to operate the register 90. The bell-crank which connects the link 52 with the rod 50 is arranged in this case to draw the rod 50 upward when the link is moved bodily, and thus draw the operating bar 88 rearward. Holes 91 and 92 in forks 93 and 94 of the toggle-operating bar 88 are so arranged that the connections between the bar and the toggle 95 may be changed in the normal forward position thereof. This form of the invention is otherwise the same as the form disclosed in Figures 1 to 7.

Attention is directed to the fact that the invention may be applied to any standard typewriting machine equipped with decimal-tabulator mechanism, without alteration of the standard parts, beyond the boring of a few holes in the frame for the attachment of brackets thereto.

Variations may be resorted to within the scope of the invention, and portions of the improvements may be used without others.

Having thus described my invention, I claim:

1. In a typewriting machine for writing bills in which one column includes only 5 and 10 cent items, a carriage, a set of number-keys from "0" to "9", inclusive, counter mechanism for adding the 5 and 10 cent items written in said column, means set by the "5" and "0" keys of said set for controlling the counter mechanism to add 5 or 10 according to the amount of an item written in said column, and means deriving its force from, and fully actuated by, the return movement of the carriage, for operating the counter mechanism.

2. In a typewriting machine for writing bills in which one column includes only 5 and 10 cent items, a carriage, a set of number-keys from "0" to "9", inclusive, counter mechanism for adding the 5 and 10 cent items written in said column, means set by the "5" and "0" keys of said set for controlling the counter mechanism to add 5 or 10 according to the amount of an item written in said column, and means actuated only and wholly by movement of the carriage from said column in the carriage-return movement for operating the counter mechanism.

3. In a typewriting machine for writing bills in which one column includes only 5 and 10 cent items, a carriage, a set of number-keys from "0" to "9", inclusive, register mechanism for adding the items written in said column, means for operating the register mechanism, and means controlled by the "5" and "0" keys for shifting the register-operating means and thereby determining the amount to be added by an operation thereof.

4. In a typewriting machine for writing bills in which one column includes items of only two amounts, a carriage, a set of number-keys, register mechanism for adding the items written in said column, register-operating means actuated by the carriage and connectible to the register mechanism in either of two ways, and mechanism operated by number-keys used in writing said amounts for controlling the connections between the register mechanism and the register-operating means to cause the correct amounts to be added by the register mechanism.

5. In a typewriting machine for writing bills in which the last column includes 5 and 10 cent items only, a carriage, a set of number-keys, register mechanism, means operated by the carriage for causing 5 or 10 to be added by the register mechanism each time that the carriage is moved from said column in the carriage-return movement and at no other time, and means controlled by the "5" and "0" keys for determining which of said amounts shall be added.

6. In a typewriting machine for writing bills in which one column includes items of 5 and 10 cents only, a carriage, a set of number-keys, register mechanism, an operating member for the register mechanism, and means controlled by the "5" and "0" keys for moving the operating member to connect it in different ways with the register mechanism and thereby control the amount added by the register mechanism upon actuation of the operating member.

7. In a typewriting machine, a carriage, a set of number-keys, counter mechanism for adding the items written in a selected column, a member for operating said counter mechanism, number-key-controlled mechanism for characteristically connecting the counter mechanism and the operating member according to the amount of the item to be added, and means fully operated by movement of the carriage for actuating said counter-operating member to effect addition.

8. In a typewriting machine, a set of number-keys, adding mechanism controlled by the number-keys to determine the amounts to be added, a carriage, a tabulator-stop on the carriage for controlling movement of the carriage to a selected column, and means deriving its force from the carriage through the tabulator-stop for fully operating the adding mechanism.

9. In a typewriting machine, a set of number-keys, adding mechanism controlled by the number-keys to determine the amounts to be added, a carriage, a plurality of tabulator-stops on the carriage for controlling movement of the carriage to selected columns, one of said tabulator-stops being longer than the other, and means for operating the adding mechanism, arranged to be engaged and actuated by the longer tabulator-stop only, to effect an adding operation.

10. In a typewriting machine, a set of number-keys, adding mechanism controlled by the number-keys to determine the amounts to be added, a carriage, a tabulator-stop on the carriage, and means for operating the adding mechanism, comprising a cam arranged to be depressed idly by the tabulator-stop in the advance movement of the carriage and to be moved bodily a predetermined distance by the tabulator-stop in the return movement of the carriage to effect an adding operation.

11. In a typewriting machine, a set of number-keys, adding mechanism controlled by the number-keys to determine the amounts to be added, a carriage, a tabulator-stop on the carriage, and means for operating the adding mechanism, comprising a cam arranged to be depressed idly by the tabulator-stop in the advance movement of the carriage and to be moved bodily by the tabulator-stop in the return movement of the carriage, means for forcing the cam out of engagement with the tabulator-stop when it has been moved a predetermined distance, and operating connections between the cam and the adding mechanism.

12. In a typewriting machine, a set of number-keys, adding mechanism controlled by the number-keys to determine the amounts to be added, a carriage, a tabulator-stop on the carriage, and means for operating the adding mechanism, comprising a cam arranged to be depressed idly by the tabulator-stop in the advance movement of the carriage and to be moved bodily by the tabulator-stop in the return movement of the carriage, means for forcing the cam out of engagement with the tabulator-stop when it has been moved a predetermined distance, and connections between the cam and the adding mechanism for returning the adding-mechanism-operating means to initial position when the cam is disengaged from the tabulator-stop.

13. In a typewriting machine, a set of number-keys, adding mechanism controlled by the number-keys to determine the amounts to be added, a carriage, a tabulator-stop on the carriage, and means for operating the adding mechanism, comprising a cam arranged to be depressed idly by the tabulator-stop as it moves in one direction and to be moved bodily a predetermined distance by the tabulator-stop as it moves in the opposite direction.

14. In a typewriting machine, a set of number-keys, adding mechanism controlled by the number-keys to determine the amounts to be added, a carriage, a tabulator-stop on the carriage, and means for operating the adding mechanism, comprising a cam and means for yieldingly supporting the cam in the path of movement of the tabulator-stop, said cam having an inclined face to be engaged by the tabulator-stop to depress the cam idly as the tabulator-stop moves in one direction, and a vertical face to be engaged by the tabulator-stop to move the cam bodily as the tabulator-stop moves in the opposite direction to effect an operation of the adding mechanism.

15. In a typewriting machine, adding mechanism, a set of number-keys, a carriage, an adjustable abutment on the carriage, means for operating the adding mechanism, comprising a cam, a member yieldingly supporting the cam in the path of the adjustable abutment on the carriage, said cam being depressible idly by the adjustable abutment in one direction of its movement and movable bodily by the abutment in the other direction of its movement to operate the adding mechanism, and co-operating means on the cam and supporting member for positively moving the cam out of the path of the adjustable abutment at a predetermined point.

16. In a typewriting machine, a plurality of number-keys, a register, means for operating the register, and mechanism for controlling the connections between the register-operating means and the register, comprising a lever arranged to be engaged and rocked in opposite directions by said number-keys.

17. In a typewriting machine, a plurality of number-keys, a register, a register-operating member, and means for controlling the amount to be added by the register upon actuation of the register-operating member, comprising a lever arranged beneath the number-keys to be engaged and rocked in opposite directions by them and a member connecting the lever with the register-operating member to move it in opposite directions and so control the connection of the operating member and the register.

18. In a typewriting machine, a carriage, a set of number-keys, a register comprising a number-wheel, carriage-actuated register-operating means reciprocable to operate said register, and number-key-controlled mechanism for causing said number-wheel to be advanced a predetermined amount during the advance of said register-operating means and an equal amount during the return of the register-operating means.

19. In a typewriting machine, a carriage, a set of number-keys from "0" to "9", inclusive, a register arranged to add 5 at each operation, a member actuated by the carriage in the return movement thereof to operate the register, said member being arranged to operate the register once or twice at each actuation according to the connections established between the member and the register, and means operated by the "5" and "0" keys for controlling said connections.

20. In a typewriting machine, a carriage, a number-key, a register comprising a number-wheel, number-wheel-operating mechanism comprising a toggle, a toggle-operating member actuated by the carriage to straighten the toggle and thereby advance the number-wheel, and key-operable means to connect the toggle to the toggle-operating member.

21. In a typewriting machine, a carriage, a set of number-keys, a register comprising a number-wheel, number-wheel-operating mechanism comprising a toggle, a reciprocable toggle-operating member actuated by the carriage to straighten the toggle and thereby advance the number-wheel, and key-operable means to connect the carriage to the toggle-operating member in either of a plurality of ways to cause the toggle to be straightened once or twice by the operation of the toggle-operating member according to the number written and to be added to the total exhibited by the register.

22. In a machine of the kind described, a register, a toggle normally flexed and arranged to operate the register when straightened, a bifurcated toggle-operating member, pins extending in opposite directions from said toggle, the toggle-operating member having a hole in each of its forks to receive one of the pins, means for actuating the operating member, means for determining the normal position of said operating member, the arrangement being such that the connection of the toggle with the operating member may be changed in the normal position of the operating member, and the pins being of such lengths that one of them will always be engaged in the corresponding hole of the operating member throughout the changing of the connections, and means for changing said connections to vary the number of times that the toggle will be straightened by a single actuation of the operating member.

23. In a machine of the kind described, a register, a bifurcated register-operating member, and means for variably connecting the operating member to the register to vary the operation of the register, comprising a pivoted arm, and a pair of bevel-ended pins extending in opposite directions from said arm at different distances from its pivot, said operating member having a hole in each of its forks for receiving one of the pins.

24. In a typewriting machine, a register, a bifurcated register-operating member, and means for variably connecting the operating member with the register to vary the operation of the register, comprising a pivoted arm, a pair of bevel-ended pins extending in opposite directions from said arm at different distances from its pivot, said operating member having a hole in each of its forks for receiving one of the pins to connect the arm and operating member, and number-key-operated means for moving the operating member sidewise to change said connections.

25. In a typewriting machine, a carriage, a register, a bifurcated register-operating member, and means for variably connecting the operating member with the register to vary the operation of the register, comprising a pivoted arm, a pair of bevel-ended pins extending in opposite directions from said arm at different distances from its pivot, said operating member having a hole in each of its forks for receiving one of the pins to connect the arm and operating member, number-key-operated means for moving the operating member sidewise to change said connections, and means for causing the operating member to be actuated by movement of the carriage.

26. In a typewriting machine, a set of number-keys, a register, a register-operating member having a uniform movement when operated, and means for variably connecting the register-operating member to the register, comprising a pivoted arm connectible at its end or at its middle to the operating member to be advanced different distances by the operation of the operating member and thereby to variably operate the register.

27. In a typewriting machine, a carriage, a set of number-keys for use in writing bills, a register for adding selected items written by the number-keys, having an oscillatory operating arm, and mechanism under the control of the number-keys and the carriage for oscillating the register-operating arm in proportion to the amount of the item to be added.

28. The combination of key-levers, register mechanism, an actuator for said register mechanism, setting means operable by said key-levers to shift the forward end of said actuator to connect the latter differently with said register mechanism, and means to operate said actuator.

29. The combination of numeral key-levers, register mechanism, an actuator for said register mechanism, setting means operable by said key-levers to shift the forward end of said actuator to connect the latter differently with said register mechanism, a carriage, and means operable by said carriage to operate said actuator.

30. The combination of numeral key-levers, register mechanism, an actuator for the register mechanism extending parallel with said key-levers, a setting device extending transversely of said key-levers and operable by said key-levers to shift the forward end of said actuator to connect the latter differently with said register mechanism, and means to move said actuator lengthwise of itself to operate said register mechanism.

31. In a machine of the class described, the combination of numeral key-levers, a guide-plate for said levers, register mechanism at one side of the machine, an actuator for said register mechanism, said actuator extending along the same side of the machine, a setting device pivoted on said guide-plate and actuable by said key-levers, said setting device moving in a plane at right angles to the actuating element, a link connecting said setting device with said actuating element whereby the actuating element may be moved laterally to change its connection with the register mechanism, and means to operate said actuator.

32. In a machine of the class described, the combination of numeral key-levers, a guide-plate for said levers, register mechanism at one side of the machine, an actuator for said register mechanism, said actuator extending along the same side of the machine, a setting device pivoted on said guide-plate and actuable by said key-levers, said setting device moving in a plane at right angles to the actuating element, a link connecting said setting device with said actuating element whereby the actuating element may be moved laterally to change its connection with the register mechanism, a typewriter carriage, and a connection extending from said actuator to said carriage, said connection being operable by said carriage to drive said actuator and operate said register mechanism.

33. The combination of numeral-keys, a register, a toggle to actuate said register, an actuator to operate said toggle, means to drive said actuator, and means operable by said keys to shift said actuator to change its co-operative relation with said toggle.

34. The combination of numeral-keys, a register, a toggle to actuate said register, an actuator to operate said toggle, a carriage, means operable by said carriage to drive said actuator, and means operable by said keys to shift said actuator to change its co-operative relation with said toggle.

35. The combination of numeral-keys, a register, a toggle to actuate said register, said toggle comprising a pivoted lever and a link connected thereto, an actuator to operate said toggle, means to drive said actuator, and means operable by said keys to shift said actuator to change its connection with the pivoted lever of said toggle.

JOHN WALDHEIM.